United States Patent [19]

Valentine et al.

[11] 4,026,040

[45] May 31, 1977

[54] EDUCATIONAL DEVICE FOR LEARNING ABOUT INDUCTORS

[75] Inventors: Charles G. Valentine, Stamford, Conn.; Douglas C. Covert, Royal Oak, Mich.

[73] Assignee: Xerox Corporation, Stamford, Conn.

[22] Filed: July 26, 1973

[21] Appl. No.: 383,370

[52] U.S. Cl. .............................................. 35/19 A
[51] Int. Cl.² ........................................ G09B 23/18
[58] Field of Search ............ 35/8 R, 8 A, 9 R, 9 A, 35/9 B, 9 C, 10, 13, 19 R, 19 A, 30, 48 R

[56] References Cited

UNITED STATES PATENTS

| | | | |
|---|---|---|---|
| 1,286,232 | 12/1918 | Coats | 35/13 X |
| 2,568,535 | 9/1951 | Ballard | 35/19 A |
| 2,603,884 | 7/1952 | Tucker | 35/19 A |
| 3,077,696 | 2/1963 | Barnett et al. | 35/19 A X |
| 3,203,114 | 8/1965 | Adler | 35/19 A |
| 3,245,156 | 4/1966 | De Bloois et al. | 35/8 A |
| 3,520,074 | 7/1970 | Severin et al. | 35/48 R |

*Primary Examiner*—Richard C. Pinkham
*Assistant Examiner*—Vance Y. Hum

[57] ABSTRACT

An educational kit for aiding a student in the understanding of the induction of electrical current and the basic functions of inductors in electrical circuits is disclosed. The educational kit includes an instructional device, preferably in the form of an audiovisual instructional device, and a simulator board that enables a student to use magnets to induce measurable current and also enables a student to measure the effects of inductors in active electrical circuits that the student designs and assembles on the simulator board.

11 Claims, 9 Drawing Figures

AUDIO VISUAL MEANS

WORK SHEETS

EDUCATIONAL DEVICE FOR LEARNING ABOUT INDUCTORS

BACKGROUND OF THE INVENTION

I. Field of the Invention

This invention relates to an educational device, and more particularly to an educational kit primarily for demonstrating, illustrating, testing and instructing about the induction of electrical current and the basic functions of inductors in electrical circuits.

II. Description of the Prior Art

A problem of increasing difficulty in the education field is that of providing relatively simple means for instructing students in a particular technology. This problem is particularly acute in community colleges, vocational high schools, trade schools, corporations which offer on-the-job training, in military service training schools, and other special schools where various types of technologies, such as for example, mechanical and electrical technologies, are sought to be taught on a simplified basis. This problem has been accentuated by the large number of new technological fields that have been developed over the past several years, and also by the large number of students seeking to gain knowledge of these fields. These developments, coupled with the high cost and complexity of the various educational devices used in schools to teach these technologies have given rise to a tremendous demand for simple, relatively inexpensive, rugged, easily assembled, relatively portable and easily understood educational devices to teach these technologies.

Furthermore, at some point during the learning process, it is desirable that the student extend beyond textbooks, manuals or diagrams and be afforded the opportunity to see, examine, and manipulate the system under study. Physical manipulation of the system aids the student in better understanding what he hears or reads about and therefore complements the entire learning process.

Recent years have marked the introduction of a large number of educational teaching devices aimed at instructing students in various technologies. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with relative sizes and shapes of objects, or correct responses to questions posed by a computer type device rewarded by permission to proceed. Although numerous efforts have been made to construct simple, relatively inexpensive, rugged, easily assembled, relatively portable and easily understood educational devices, known devices, although satisfactory in some of these respects, do not possess these combined advantages when compared to the novel and advantageous educational kit of the present invention.

Unlike the prior art devices described in the above references, the present invention is directed to a programmed educational kit which employs a multimedia approach in teaching a relatively sophisticated technology whereby a student can learn by himself by using a simulator board in response to instruction means which is logically keyed to the simulator board.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few effective educational devices available in the community colleges, the junior colleges, the vocational high schools, the trade schools and other special schools where various types of mechanical, electrical, medical or other occupational technologies are sought to be taught on a simplified and individualized basis. There is a great need for programmed instructional materials in the various areas of occupational technology such as for example, electronics, automotive technology, drafting, heating and air conditioning, and in the medical and chemical areas of technology, as well as in the traditional areas of high school study.

SUMMARY OF THE INVENTION

It is therefore an object of the present invention to overcome the disadvantages of the prior art educational devices and to provide an educational kit which is simpler, more durable, less expensive, more easily assembled and still more pleasing from a design viewpoint than prior art devices and otherwise more suitable for use in various types of learning institutions for understanding and acquiring a substantial amount of knowledge about inductors.

It is a further object of this invention to provide programmed educational kits which present information using a multimedia approach.

It is a further object of this invention to provide an educational kit which is compact when assembled.

It is a further object of this invention to provide an educational kit which is quickly disassembled for easy storage in a very small space.

It is a further object of this invention to provide an educational kit which does not require the student to use a single grommet, screw, bolt, rivet or similar fastening type connection.

It is a further object of this invention to provide an educational kit suitable for teaching students the fundamentals about the induction of electrical current and the basic functions of inductors in electrical circuits.

It is a further object of this invention to provide an educational kit which enables an instructor to play a more active role in student learning.

It is a further object of this invention to provide an educational kit which enables the student to learn using several forms of communication.

It is a further object of this invention to provide an educational kit which enables the student to participate in different kinds of learning experiences; i.e., the student listens to information while viewing a series of related visuals, such as photographs, drawings, written information, etc., and participates in a manipulative activity.

It is a further object of this invention to provide an educational kit which provides means to test the student while he is learning.

It is still a further object of this invention to provide an educational kit which, in addition to its educational features and mechanical advantages, possesses a pleasing design.

The foregoing objects and others are accomplished in accordance with the present invention by providing an educational kit for teaching about the induction of electrical current and the functions of inductors in electrical circuits comprising audiovisual instructional means; and a simulator board having mounted on a surface thereof a plurality of electrical jacks, the board including at a first area on the surface of the board at least one air core inductor; at a second area on the surface of the board a first and a second inductor in spaced relationship, the second inductor being electrically connected to an electrical switch, at a third area on the surface of the board means adapted to permit a user to assemble and test electrical circuits including at least one inductor; and means for connecting a voltage source to the board.

The educational kit in accordance with the present invention is designed to teach about inductors using a programmed multimedia approach whereby the student hears and sees information, performs by answering questions, solves problems and manipulates objects. Each time a student learns something new, he responds to this new knowledge or skill to make sure he has learned it correctly. First, he performs an activity such as by answering a question or solving a problem. Then he finds out immediately if the answer is correct. If the student finds that his answer is correct, this "instant feedback" motivates him to continue learning. If he discovers that his answer is wrong or inadequate, he can stop at that point and find out where his error is.

The educational kit is designed for individual use, use by small groups without the need for extensive supervision or participation by an instructor, or use by groups with an instructor. It permits the student to learn at his own pace, and also affords him the chance to capitalize on the way he learns best because he participates in different kinds of learning experiences. He listens to information while viewing a series of related visuals and participates in manipulative activity. He is thus totally involved in the learning process.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
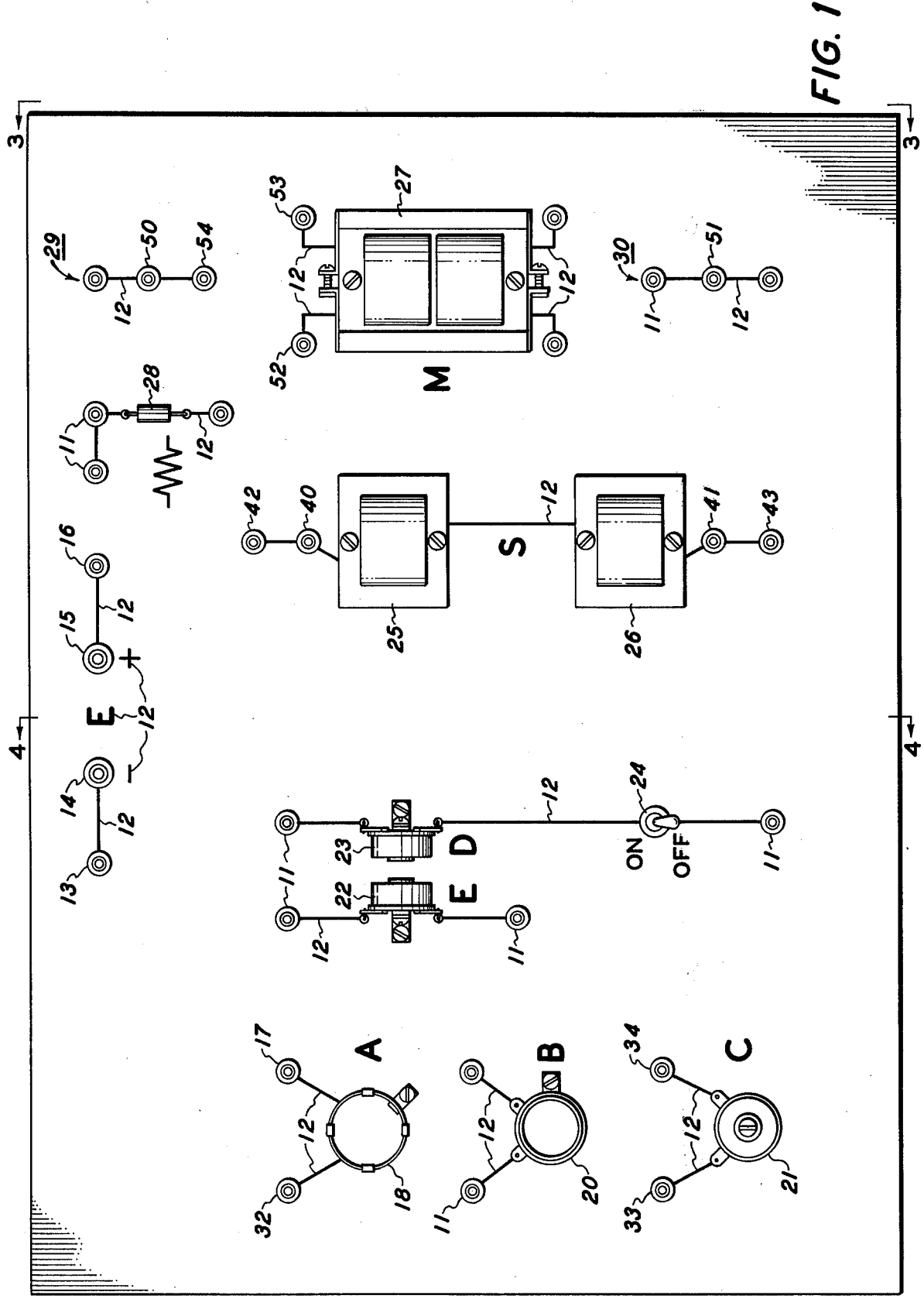
FIG. 1 is a plan view of a preferred simulator board in accordance with the invention.

In FIG. 1 there is shown a simulator board 10 which actively allows a student to actually use his hands as a learning tool as well as his eyes and ears. By performing activities using the simulator board, the student takes an active part in the learning process and achieves an understanding of the induction of electrical current and the functions of inductors in electrical circuits.

Figure 4:
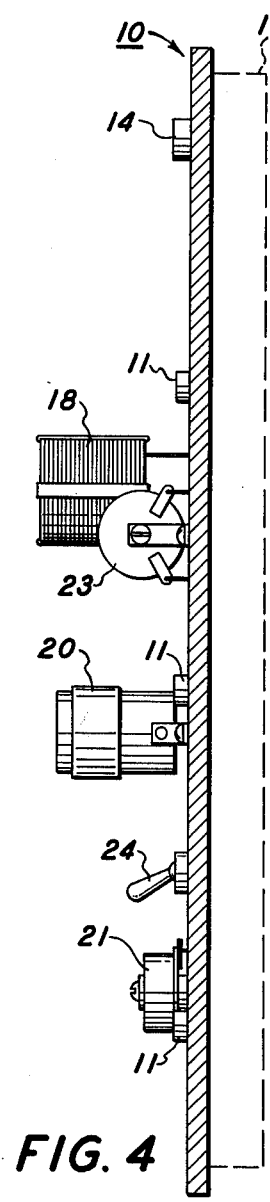
FIG. 4 is a sectional view of the simulator board taken along line A—A of FIG. 1.
Figure 3:
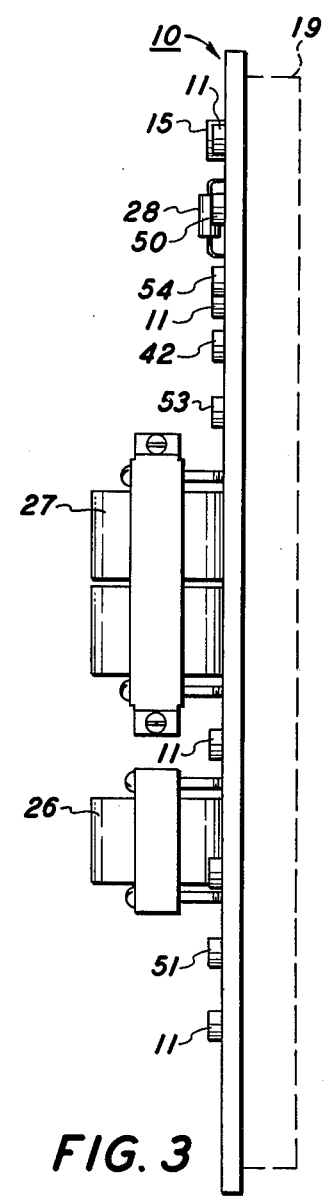
FIG. 3 is a side plan view of the simulator board of FIG. 1.

As shown in FIG. 1, a preferred simulator board 10 in accordance with the invention is shown including a plurality of electrical jacks 11, preferably female-type jacks, arranged on various portions of the board. The jacks are mounted on the board and extend through the board to the bottom portion thereof. Each of the jacks is connected by graphic indicia 12 which represents electrical connections (simulated wiring) to either another jack or to an electrical component forming several incomplete electrical circuits. On the bottom portion of the board, the jacks are electrically connected by wire to form the type of electrical connection as depicted graphically on the front portion of the board. Thus, for example, on the bottom portion of the board there is a wire connecting jacks 13 and 14, a wire connecting jacks 15 and 16, a wire from jack 17 to inductor 18, etc. The board also includes other graphic indicia such as the letters A, B, C, etc., identifying the various components mounted on the board; symbols for electrical components; etc. The electrical wiring and components projecting on the bottom portion of the board is designated as 19 in FIGS. 3 and 4.

The board 10 includes means for connecting a voltage source thereto. This is preferably done by providing, as shown in FIG. 1, a pair of jacks 14 and 15 and graphic indicia E which represents that this portion of the board is used for connecting the power supply to the board. Various types of power supply units can be used, such as for example, a D.C. power supply unit. Whatever source is used to supply voltage to the board, the connecting leads from the voltage source are connected from the source to jacks 14 and 15, the correct polarity being designated by the plus and minus signs on the board closely spaced to these jacks. Adjacent jacks 14 and 15 are jacks 13 and 16 which enable the voltage to be supplied to the various circuits which the student assembles on the board in the manner as described hereinbelow.

Mounted at different areas on the board are numerous electrical components which allow the student to learn about inductors by enabling the student to (1) use a magnet to induce a measurable current, (2) induce a measurable current from one inductor to another, and (3) measure the effects of inductors in active electrical circuits that the student designs and assembles on the board. A first area on the front surface of the board includes at least one air core inductor that enables the student to use a magnet, such as for example a bar magnet, to induce a measurable current. As shown in FIG. 1, this portion of the board preferably includes two air core inductors 18 and 20, inductor 20 preferably having a greater number of wire turns to the inch than inductor 18 such that the effect of having a greater number of turns in an inductor can be exhibited to the student. To allow the student to further observe this principle, this portion of the board also preferably includes a choke type inductor 21 containing many more turns of wire than both inductors 18 and 20. Positioned close to each of inductors 18, 20, and 21 are a pair of electrical jacks which allows the student to electrically connect a meter to each of the inductors to measure induced current. To permit a student to observe the induction of current from one inductor to another there is positioned at a second area on the board preferably two closely spaced choketype inductors 22 and 23. Electrically wired to inductor 23 is an on-off switch 24. To permit the student to measure the effects of inductors in active electrical circuits that the student designs and assembles, there is provided on a third area of the board means adapted to permit the student to assemble and test electrical circuits including at least one inductor. This is preferably done in accordance with the present invention by providing two metal core-type inductors 25 and 26 (e.g. iron core inductors) wired in series, a pair of inductors mounted on the same core and frame identified in the drawings as 27, a resistor 28, two terminal strips 29 and 30 each strip containing three electrical jacks and a plurality of jacks as shown in FIG. 1. These three areas of the simulator board are electrically wired and include such components so that the student can use a magnet to induce a measurable current, induce a measurable current from one inductor to another, and measure the effects of inductors in active electrical circuits assembled on the board, in the manner as described hereinbelow.

Figure 2:
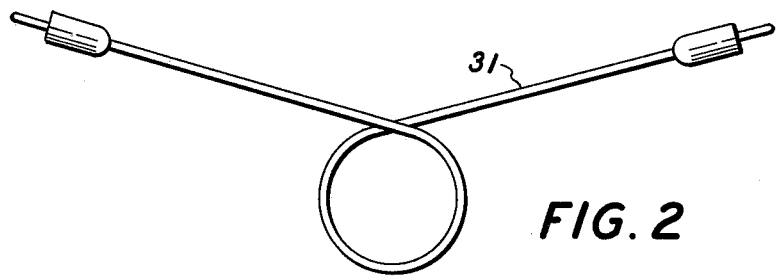
FIG. 2 is a plan view of preferred male connecting leads.

FIG. 2 is representative of one of several male-type connecting leads 31 which are used with the educational kit of the present invention. The sizes of the connecting leads used with the board can vary, but it is preferred to use various connecting leads ranging in size from 6 to 18 inches. The connecting leads are adapted to be inserted into certain of the electrical jacks on the simulator board in the manner as described hereinbelow.

The simulator board 10 can be constructed by numerous methods. For example, the simulator board can be constructed of a sheet of a substantially rigid material such as fiber board, or a polymeric material, such as for example, vinyl, the material having a preferred thickness of about ¼ inch. The board is painted with a neutral background color, such as for example, a yellow or white enamel. The graphic indicia present on the board can then preferably be printed over the enamel background in a suitably contrasting color, such as for example, black. The printing may be accomplished by any suitable means, such as for example, a silk screening process. The board can also be constructed of a sheet of metal, such as for example, galvanized steel, or a plastic, over which is painted the neutral background color, such as for example, a yellow or white enamel. In this embodiment the graphic indicia is placed on the metal or plastic as described above. Although the simulator board may consist solely of a thin sheet of metal with suitably smooth edges, the sheet is preferably laminated to a suitable backing member, which imparts a desirable rigidity thereto and also allows the simulator board to be conveniently handled. Thus, in one embodiment of this invention, the simulator board may comprise a thin sheet of meta having a thickness of about 1/32 inch laminated to a backing member made from a rigid material such as fiber board, or a resinous material, the backing member having a preferred thickness of about ¼ inch. The edges of the completed board can be covered with a plastic material to obtain a neat appearance and also to avoid the problem of having sharp edges. The dimensions of the simulator board should be such that the board can be conveniently used by the student at a given workplace. Boards having dimensions of about 15 × 20 inches, or approximately 300 square inches, are particularly suitable.

Various kinds of instructional means can be employed with the educational kit in accordance with the invention. For example, one of the preferred embodiments for instructional means is an audiovisual presentation using slides or film strips in conjunction with a descriptive audio account of the visuals, such as an audio cassette. The visual materials are synchronized with the audio presentation. The audiovisual portion makes it possible for a student to learn by listening to a description while seeing what is being described. A recorded narrator provides background information, describes equipment, or explains principals of operation while a series of illustrated visuals (photographs, graphs, drawings, written material, etc.) is shown to the student synchronized with the audio presentation. The narrator also tells the student, for example, how to proceed: whether to observe something that is being shown to him, to perform an activity on the simulator board 10, or to complete a question or problem on the student's worksheet; he suggests points at which the student might ask for help and, along with the visual portion provides answers to the questions or information about the simulator board or equipment. The audiovisual presentation is stopped each time the narrator asks the student to do something. The student starts the sequence again after he completes the activity.

The audiovisual equipment needed, of course, will vary depending on the type of instructions to be given. A rear screen projector for small groups, or a projector and screen for a classroom presentation may be used. For the audio presentation either visual projection equipment with built-in audio capability or a separate cassette recorder may be used. The audio presentation may be on, for example, cassettes, and the visual portion on, for example, 35 mm film strip or slides.

In order to give the student an additional opportunity to check his grasp of the material he is learning, the student may be called upon throughout the unit to construct definitions, label components, answer questions, and solve problems. To achieve these objects the kit preferably includes work sheets that restate the question or problem and provide working space and answer blanks. The work sheets are preferably laminated so that the student can easily erase an answer and redo a problem with the added advantage that the sheets can be cleaned off for use by another student. The work sheets are also beneficial in telling the instructor about a student's work habits and whether or not he is benefiting from the kit. In addition, an instructor's review of the work sheets can help him locate the point at which the student is having difficulty.

All of the above materials can be conveniently housed in a compartment-like case for easy use and storage. Thus, the educational kit which can include the simulator board 10, the instructional means, such as video slides or tapes, the audio cassettes, the connecting leads 31, and the work sheets, can all be contained within one case. The kit may also include sample tests or quizzes which can be given by the instructor before and after use of the program and an instructor's manual.

An example of how a preferred embodiment of an educational kit in accordance with the present invention may be used to teach the induction of electrical current and the basic functions of inductors in electrical circuits is as follows: The audiovisual presentation begins with an historical summary of the two related electrical properties discovered by Michael Faraday in 1831, i.e., in a closed circuit, the flow of current appears to be opposed whenever current changes and a change in the current of one circuit may cause or induce a current flow in nearby circuits even if the two circuits are not physically connected. These two concepts are discussed in detail. Thereafter, the presentation focuses on some of the similarities and differences between direct current and alternating current; how alternating current can be produced; and some basic effects of alternating current, all of these items being discussed in detail.

During the audiovisual presentation, as the student is introduced to various concepts, terms, definitions, etc. he may be asked to copy certain of these items in his work sheets. For example, after the audiovisual presentation explains to the student some of the basic differences between direct and alternating current the student can be referred to a specific item in his work sheets which may represent a specific question relating to some of the similarities and differences between direct and alternating current as previously presented to the student. After answering the question, the slides then give the correct answer to the student for him to check with the answer that he has written on his work sheets. In those instances where answers other than those shown on the slides would be correct this information is also presented to the student. The instructional material is presented to the student by means of visual slides and a synchronized audio presentation.

The presentation continues by presenting to the student a detailed description of the concept of induction. For example, first the student is reminded that when current flows in a wire, a magnetic field exists around the wire and when the current is changed, the magnetic field changes. The change in magnetic force creates a voltage opposing the applied voltage. Thereafter, it is explained that while the field is changing, the magnetic force changes and a wire or conductor lying in that changing magnetic force field will have an induced voltage which occurs as a result of the force crossing the conductor. The magnetic field around a single wire is relatively weak. If the wire is bent into a loop, all the lines of magnetic force will pass through the center of the loop in one direction and return around the outside of the conductor. The direction of the current will not affect the strength of the field, but it will affect its polarity. By winding the wire into a coil of many turns, the fields combine and a single strong field results, as opposed to a magnetic field around a single wire which is relatively weak. When current flows through it, the coil becomes a magnet, called a solenoid, the magnetic field disappearing or collapsing if the current is removed. The presentation goes on to explain that the same kind of simple magnetic field exists around a bar magnet which is often called a permanent magnet. Thereafter, the terms solenoid and relay are discussed in detail including how they relate to an electromagnet.

At this point in the program certain important previously taught items are reviewed along with the presentation of new material. For example, the student is reminded that by varying the current in a wire, either in amount or direction, one can change the magnetic field it produces. Furthermore, by forming the wire into a coil and adding an iron core in the coil the strength of the field created around the coil is greatly increased. Current can be induced in a wire, or in a coil of wire, by having it within a changing magnetic field. The presentation proceeds by explaining that when a wire moves through a magnetic field, a current is generated in the wire. The faster the wire moves, the more magnetic lines of force are cut per second and the greater the induced current. The student is told that this is just the opposite of holding the wire fixed and varying the magnetic field, but the results are the same, namely that of inducing current. The general rule, i.e., any relative motion between lines of magnetic force and a conductor will induce a voltage in that conductor, is then given to the student and explained as being the principle behind alternating current generators. Thereafter, the generation of alternating current is explained to the student by showing in a simulated manner on the slides the revolving of a single loop of wire conductor through a magnetic field which is depicted as existing between the poles of a permanent magnet. At the samme time that the slides show the single loop of wire revolving in the magnetic field, a graph shows the student the effect on voltage as the single loop of wire revolves 360° in the force field. The student is told that the rotation of the loop of wire through 360° produces a complete range of induced voltage values, half of them positive, the other half being negative. This is shown on the graph as alternating voltage in the form of a sine wave. The fact that the magnitude of the induced voltage would be increased if the number of loops of the wire conductor was increased is also explained.

At certain points during the presentation, the student is asked to turn to the simulator board 10. To further help the student understand the induction of electrical current and some basic functions of inductors in electrical circuits, he employs the simulator board to perform various experiments. For example, the student is initially referred to the left side of the simulator board shown in FIG. 1 where there is mounted three inductors 18, 20, and 21 identified on the board as A, B, and C. The student is told to first connect the leads from a multimeter (a volt-ohm-milliammeter) to jacks 32 and 17 by inductor 18, an air core inductor containing 32 turns to the inch. The student then sets the multimeter selector switch to the most sensitive setting for DC milliamps. He then inserts one end of a bar magnet down into inductor coil 18 through the open core and quickly withdraws the magnet while watching the multimeter needle carefully. By doing this the student observes a slight movement of the needle. By inserting the bar magnet in and out of inductor 18 the student observes the meter needle moving in one direction and then the opposite direction. Thereafter, the audiovisual portion explains to the student that the magnetic field of the bar magnet extends through the air from one pole of the magnet to the other. As one moves the magnetic field through the coiled wire the imaginary lines of magnetic force cross the conductor and induce a current which the meter detects. By changing the direction of magnet movement, the field crosses the conductor in a reverse direction which reverses the direction of the induced current. Thereafter the student connects the leads from the multimeter to inductor 20, an air core inductor constructed in two layers with separate terminal pairs. The outer layer of this coil has many more turns; each being more closely spaced, than inductor 18. Once again the student uses a bar magnet, inserts it into inductor 20, withdraws it quickly, and watches the meter needle. By doing this the student observes a much stronger needle deflection than that noted when the same procedure was followed using inductor 18. At this point the audiovisual presentation might ask the student why there was a greater deflection when the bar magnet was used with inductor 20 as compared with inductor 18. After recording the answer in his work sheets the slides would then present the correct answer to the student, i.e., the greater number of turns in inductor 20 resulted in a greater total of induced current. To further observe this principle, the student is referred to inductor 21, a choke inductor containing many hundreds of turns more than both inductors 18 and 20. The student first places the leads from a meter into jacks 33 and 34, and then places the end of a bar magnet on top of inductor coil 21. By lifting the magnet quickly away from the inductor the student observes a much more responsive movement of the meter needle to this action than that observed with inductors 18 or 20.

Figure 5:
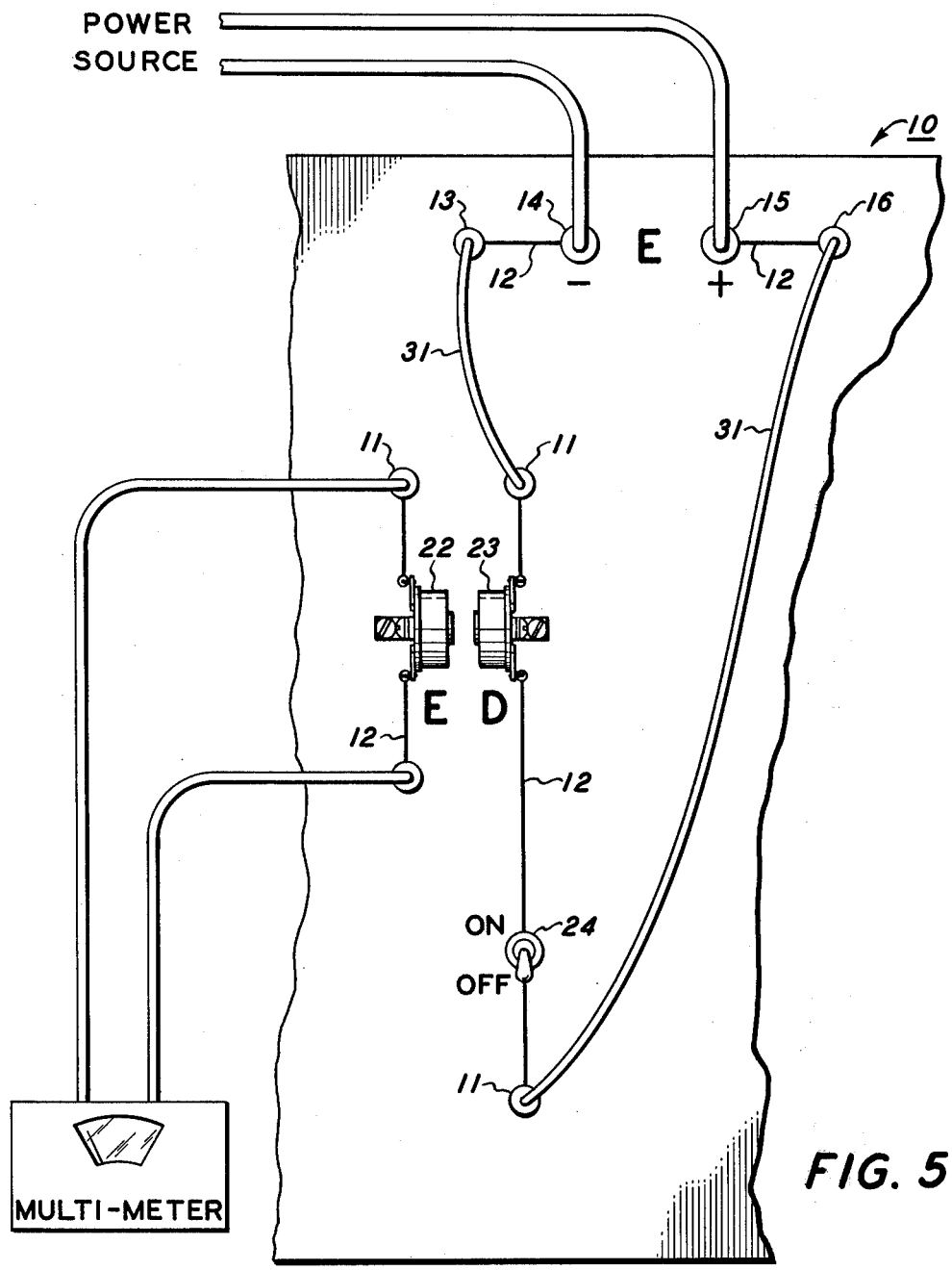
FIG. 5 is a sectional view of the simulator board shown in FIG. 1 with several male connecting leads in place.

The student also uses the simulator board 10 to observe how a current can be induced from one inductor to another. This is done by setting up a circuit using several connecting leads 31 in the manner as shown in FIG. 5. With the power supply to the board turned on, e.g. a DC power supply unit, and the range selector switch on the multimeter set at the lowest DC milliamp range, the student observes the multimeter needle as switch 24 is turned on and off. In this case, the student observes that the multimeter needle moves up slightly as he turns the switch on and then settles back to zero. When he turns the switch off, the needle will move in the opposite direction and then again return to zero. Thereafter the student connects an AC power source to the same circuit as shown in FIG. 5.

The audiovisual portion explains that in order to have current, there must be a voltage and if a current is induced in inductor 22, it can also be measured as a voltage across the inductor. As previously done with the DC power input, the student observes the multimeter needle as he turns on both the AC power supply and switch 24. This time the student notes that the needle rises and stays steady indicating a continuing voltage and thus a current induced in inductor 22.

In the next portion of the program the student's attention is initially directed to a brief review of that which was taught in the first portion of the program followed by a detailed discussion pertaining to sinusoidal voltage and current. The audiovisual presentation explains that the reversing nature of alternating current produces expanding and collapsing fields which induce voltage and current fluctuations. These fluctuations vary as a sine wave and as the field expands and collapses continuously. In order to identify and explain some of the voltage variations in AC circuits, the student is told to examine the four key segments of the sine wave, i.e., (1) the portion where voltage varies from zero to a maximum positive value; (2) the portion where the voltage drops to a zero value; (3) the portion where the voltage increases to a maximum negative value; and (4) the portion where the voltage then decreases to zero as the cycle is completed. As each of these concepts are explained to the student by the audio portion of the presentation, the slides show each of the portions of the sine wave that is under discussion. The presentation continues by explaining that zero voltage occurs at 0°, 180°, and 360°, whereas maximum voltage occurs at 90° and 270°. Returning to the concept of induction the presentation explains that the voltage induced in each side of a rotating loop at any instant in time may be added together to represent the total voltage induced at that instant. For many loops connected together, the student is told to add each loop's contribution to the total voltage which for any given instant of time is called instantaneous voltage ($e$). The presentation next focuses on the concept that any reversal of voltage at regular intervals will produce alternating current, but not necessarily in the form of a sine wave. At this point several non-sine wave forms are discussed in detail.

Thereafter the presentation discusses the application of an AC voltage to the filament of a light bulb. In this regard it is explained that a lamp filament glows as the voltage rises, then dims and goes out again as the voltage drops to zero. As the voltage increases to its negative peak, the lamp glows again and then dims and goes out when the voltage again reaches zero. However, if this cycle is repeated fast enough, as is the actual case, the lamp filament glows continuously. The presentation explains that the number of complete cycles made by an AC voltage in one second is called its frequency. The symbol is small $f$, and is referred to in units of hertz, abbreviated H.

The presentation next focuses on the various common inductors that are found in electrical circuits and the effect that these inductors have within the circuits. The slides show pictures of various common inductors while the audio portion explains that the number of turns, their spacing, the core material and the configuration of the winding are very important factors in determining inductance value. The presentation goes on to explain that in electronic circuits, inductors delay all changes in current through them. The greater the inductance value of the inductor, the longer the delay. To illustrate how this delay occurs, the student is shown on the slides a circuit including a switch, an inductor, and a normal DC power source (e.g., a battery). The presentation explains that with the switch open, there is no current flowing and no magnetic field in the coil. The instant the switch is closed, voltage is imposed on the circuit, which tries to increase the current instantly. As the current begins to rise, however, a magnetic field grows to oppose this change. As the current increases, the magnetic field around each individual turn of the coil increases and combines until there is a growing field around the entire coil. This magnetic field creates a voltage across the inductor, having a polarity opposite that of the battery. This voltage is called a back E-M-F. The back E-M-F or back voltage keeps the current from rising immediately. If the switch position is moved such that the power source no longer supplies power to the inductor, the applied voltage is disconnected and the magnetic field begins to collapse. The collapsing field reverses the voltage polarity of the inductor as the current falls toward zero. Thereafter the presentation explains the difference between inductance and induction, gives the symbol for inductance and the units for its measurement, defines inductive reactance, and presents a detailed discussion of each of these items.

Figure 6:
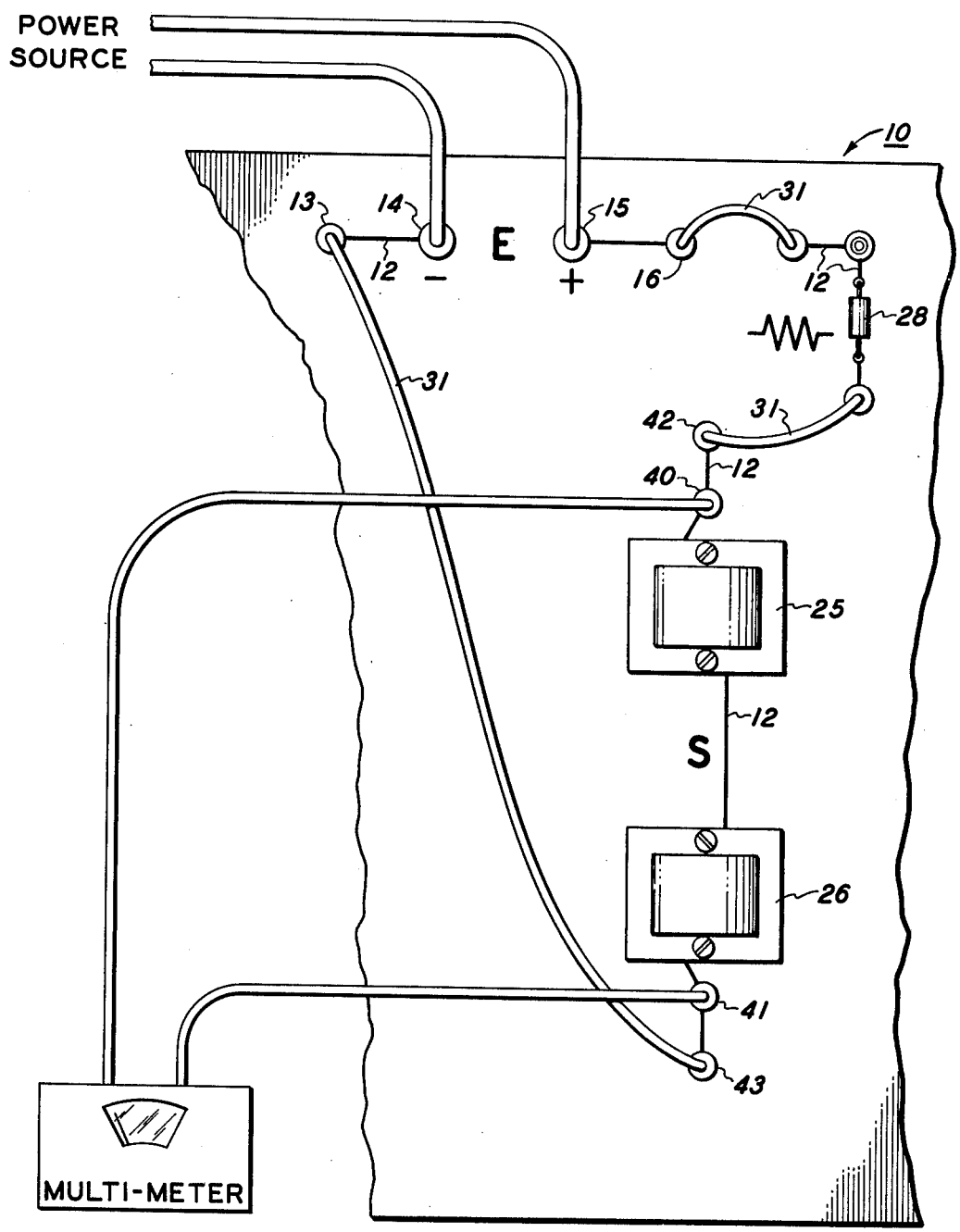
FIG. 6 is a second sectional view of the simulator board shown in FIG. 1 with several male connecting leads in place.

The student is then again asked to turn to the simulator board, in particular the right side portion of the board containing inductors 25 and 26 wired in series and labeled S. At first, the student uses a multimeter to measure the resistance across inductors 25 and 26 by inserting the leads from a multimeter into jacks 40 and 41. By assuming a 50 milliamp current applied to this pair of inductors, as told to the student by the presentation, the student uses Ohm's Law to calculate the expected voltage drop if the circuit was only resistive. Thereafter the student is instructed to connect a power supply to the simulator by connecting the leads from the power supply to jacks 14 and 15 to provide an AC voltage of 12 to 13 volts; connect the power to resistor 28; connect the resistor to jack 42 by inductors 25 and 26; and complete the circuit by connecting the jack 43 to the simulator power output jack 13. This arrangement is shown in FIG. 6. The student is instructed to turn on the power and measure the voltage drop across inductors 25 and 26 by inserting the leads from a multimeter into jacks 40 and 41. The student is also told to compare this recorded measurement with that which he calculated previously. Thereafter the presentation explains that the difference in the two voltage drops is the result of inductive reactance. Furthermore the presentation explains that because all of the inductance effects in this circuit are from the circuit components with no influences from outside the circuit, it is called self-inductance. The student then proceeds to calculate the inductive reactance for this circuit.

Figure 7:
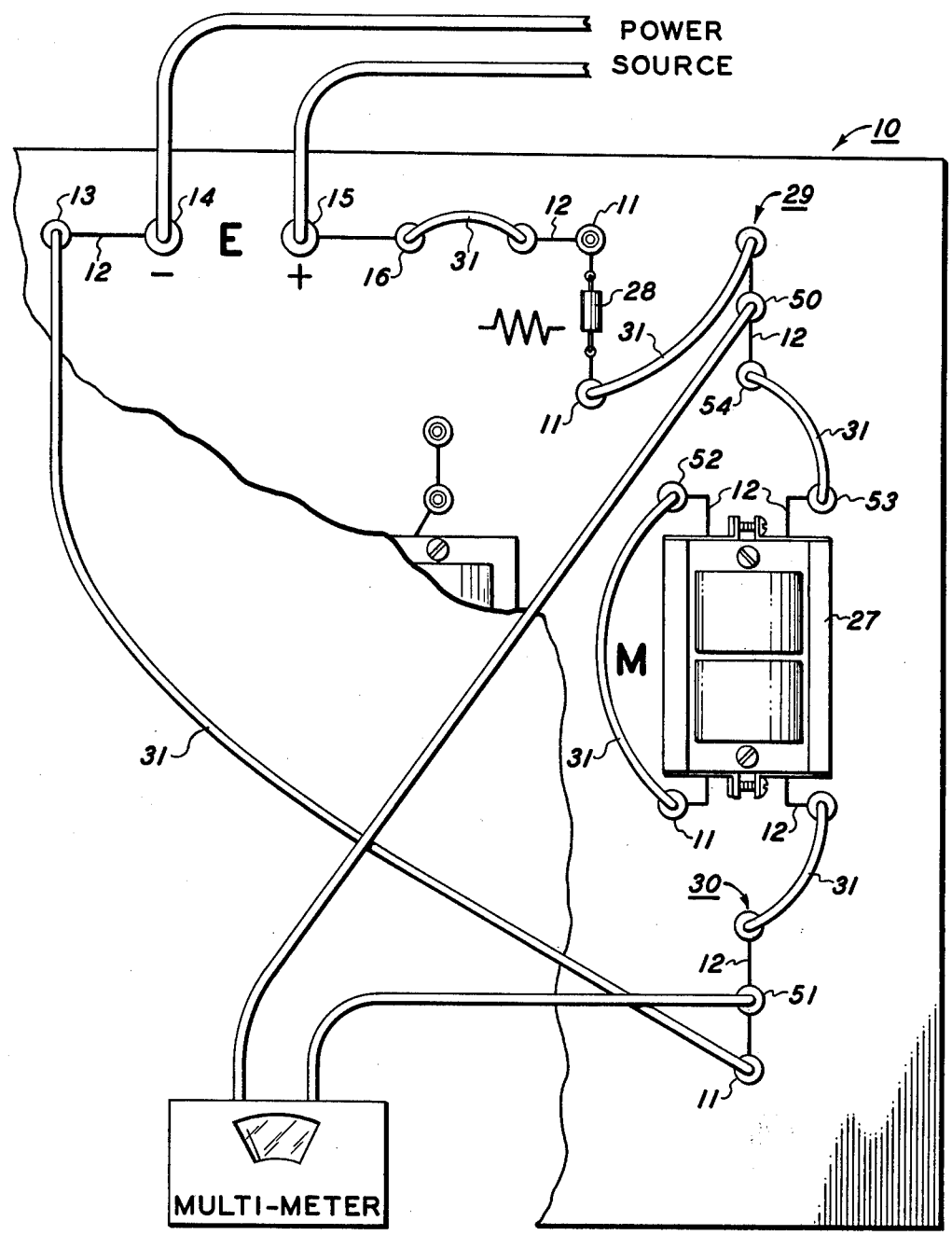
FIG. 7 is a third sectional view of the simulator board shown in FIG. 1 with several male connecting leads in place.
Figure 8:
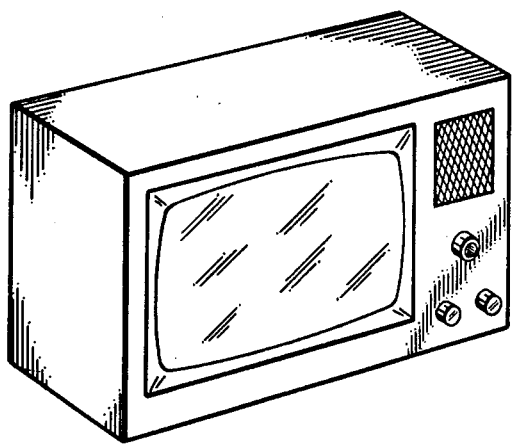
FIG. 8 illustrates generally an audiovisual device suitable for use in the present invention.
Figure 9:
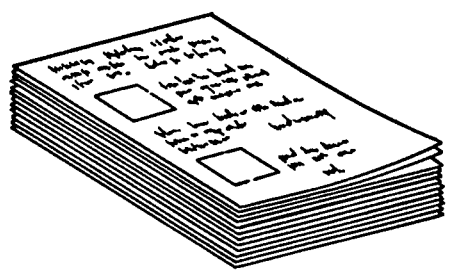
FIG. 9 illustrates generally worksheets in accordance with the present invention.

With the power input leads from the power source connected to jacks 14 and is, the student is then instructed to connect the simulator power output to resistor 28 and connect the resistor to the top of terminal strip 29. The pair of inductors 27 labeled M is mounted on the same core and frame. The student is instructed to use connecting leads 31 to connect the pair of inductors in series and then complete the circuit in the manner as shown in FIG. 7. By employing 12 volts AC to the circuit, the student measures the voltage drop across the pair of inductors 27 by connecting the leads from the multimeter to jacks 50 and 51. Thereafter, the student is instructed to change the circuit by removing the connecting member from jack 53 and inserting it into jack 52 and by removing the connecting member from jack 52 and inserting it into jack 53. Once again the student is instructed to measure the voltage across inductors 27. The presentation then explains to the student that within tolerances, the first measurement should have been about one-half the second measurement. As the slides show circuit diagrams of the two circuits which the student created on the simulator board, the presentation explains that when two or more inductors are connected in series in an AC circuit, the total inductance of the circuit can be determined by adding the individual inductances, but only if the inductors are far enough apart, or at right angles to each other, so that their magnetic fields do not overlap and interfere with each other. If the inductors in an AC circuit are close together, some mutual inductance will occur which will have a measurable effect on the total circuit. Mutual inductance is the result of a current change in one conductor producing a voltage change in another conductor. Each affects the other to further affect the voltage in both. In the second circuit creating using inductor M on the simulator board, the polarity of the field of each inductor is in the same direction. The mutual inductance effect added to the sum of the two individual inductors which increased the opposition to current and resulted in the higher voltage drop. In the first circuit created on the simulator board using inductor M, the series connection of one coil was opposite that of the other, so the polarities of the fields were in opposite directions. In this case, the mutual inductance effect opposes the sum of the individual inductances. Again, the mutual inductance effect is taking place, but this time it is subtracted. These inductors are said to be bucking or opposing. The bucking effect on the simulator was almost high enough to cancel the inductive reactance.

After using the educational kit in accordance with the present invention, the student will understand the induction of electrical current and the basic reaction of inductors in electrical circuits, and will be able to define or describe back, E-M-F or back voltage, cause of electrical current, AC maximum value, AC peak value, AC peak-to-peak value, induction, inductance, self-inductance, mutual inductance, and inductive reactance; describe the principle difference between direct and alternating currents; describe the cause of a continually changing magnetic field size around a conductor in an AC circuit; describe the reason for polarity reversal of the magnetic field around a conductor in an AC circuit; define AC frequency in terms of complete cycles in one second; identify the common U.S. line frequency; define or describe $KH_z$ and $MH_z$ in terms of frequency; identify by name the written symbols for inductance, mutual inductance, frequency, and inductive reactance; describe the difference in the polarity characteristic of AC and DC; identify, given simple diagrams: basic AC and DC wave forms, current direction (given polarity), and maximum voltage from a series of instantaneous voltages; name the type of current which produces a sine wave; identify the cause of an electromagnetic field around a conductor; describe the induction of voltage in a conductor adjacent and parallel to an AC conductor; describe how the collapsing magnetic field of an inductor induces current in a circuit; state the effect of inductance on a changing current; describe how inductor polarity effects current opposition; describe the aiding and opposing effects of mutual inductance; state the basic formula for determining total inductance, in a series circuit containing several inductors, excluding mutual inductance; and name four major factors affecting inductance value.

Details of the various methods by which students can use the educational kit of this invention are explained in detail in "Occupational Technology Series, Electronics Technology, Basic L Circuits, Unit 11129-81" published by the Xerox Corporation.

We claim:
1. An educational kit for teaching the induction of electrical current and the function of inductors in electrical circuits comprising in combination:
   a. a simulator board having mounted on a surface thereof a plurality of electrical jacks, said board including (i) at a first area on said surface at least one air core inductor and at least one choke inductor, each of said inductors having a different number of wire turns and each having in spaced relation and electrically wired thereto a pair of said jacks, whereby the user of said kit measures a magnet with said inductors to induce a current and connect a meter to each of the inductors to measure the induced current thereby observing the effect of varying the number of wire turns on an inductor; (ii) at a second area on said surface of said board a first and second inductor, said inductors being spaced from each other at a distance sufficient to permit current to be induced in said first inductor when a current is applied to said second inductor and two pairs of said jacks, said second inductor being electrically connected to an electrical switch and one pair of said jacks and said first inductor being electrically connected to another pair of said jacks, whereby the user of said kit measures and observes the induction of current from one inductor to another; (iii) at a third area on said surface of said board means adapted to permit the user of said kit to design and assemble electrical circuits including at least one inductor whereby said user observes and measures the effects of inductors in active electrical circuits that said user designs and assembles; and (iv) at a fourth area of said surface of said board means for connecting a voltage source to said second and third areas on said board; and b. audiovisual instruction means for presenting information relating to the induction of electrical current and the functions of inductors in electrical circuits, the user of said kit employing in proper sequence the first, second, third and fourth areas of said board in response to instructions given by said instruction means.

2. An educational kit according to claim 1 wherein said audiovisual instruction means includes visual and audio instructional portions terminating in audio directions to the user of said kit to perform a manipulative activity using said first, second, third and fourth areas of the simulator board, said instruction means stopping upon completion of said audio directions and being restartable by the kit user upon completion of said manipulative activity.

3. An educational kit according to claim 1 wherein the first area of said board includes two air core inductors, each inductor being electrically connected to a pair of said jacks.

4. An educational kit according to claim 1 wherein said means on the third area of said board include a plurality of components mounted to said board, said components comprising two metal core inductors electrically connected in series, a resistor, and a pair of inductors mounted on the same core and frame, each of said components being electrically connected to a plurality of said jacks.

5. An educational kit according to claim 1 wherein said means for connecting a voltage source to said board includes a pair of said jacks, each jack of the pairs being electrically connected to a jack in spaced relation thereto.

6. An educational kit according to claim 1 wherein said board includes on the surface graphic indicia representing identifications of each of the components on said board and indicia representing electrical connections between the components and the electrical jacks.

7. An educational kit according to claim 1 further including a plurality of connecting lead wires adapted for insertion in said jacks.

8. An educational kit according to claim 1 wherein said audio instructional means includes tape recordings which are synchronized with said visual instructional means which includes slides or film strip.

9. An educational kit according to claim 1 wherein said kit includes a plurality of student work sheets, said work sheets being adapted for use by the student to record information and test the student in response to said audiovisual instructional means.

10. An educational kit according to claim 1 wherein said simulator board is constructed of a substantially rigid material.

11. An educational kit according to claim 1 further comprising a compartmentalized case, said case being adapted for storage of said kit.

* * * * *